Patented May 19, 1942

2,283,327

UNITED STATES PATENT OFFICE 2,283,327

AZO DYESTUFFS

Friedrich Felix, Basel, and Rudolf von Capeller, Riehen, Switzerland, assignors to the firm Society of Chemical Industry in Basle, Basel, Switzerland No Drawing. Application November 7, 1940, Serial No. 364,750. In Switzerland September 18, 1937

6 Claims. (Cl. 260—205)

This application is a continuation-in-part of our application Serial No. 239,404 of November 7, 1938, which is itself a division of our application Serial No. 218,221 of July 8, 1938. In the first named application there are described, among other things, azo-dyestuffs of the general formula

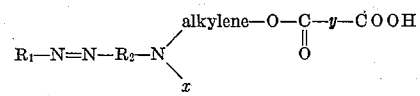

in which $R_1$ and $R_2$ represent nuclei of the benzene series, in which the group

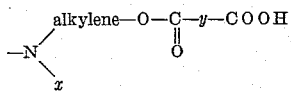

stands in the para-position to the azo-group and in which $x$ represents hydrogen or alkyl, this term including also substituted alkyls, such as an

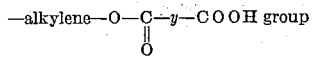 group and in which the

and the —COOH groups are united by the connecting link $y$.

In this application it is further stated that oxalic acid is to be included among those acids which correspond to the radical CO—$y$—COOH.

The subjects of the present application are also dyestuffs of the above general formula, but, in this instance, an $NO_2$ group is contained in the para-position to the N=N group in the radical $R_1$, and the radical CO—$y$—COOH in the formula stands for the radical of oxalic acid.

These dyestuffs may be prepared, for example, by treating an azo-dyestuff of the general formula

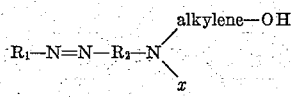

in which $R_1$, $R_2$ and $x$ have the meanings already given, in an organic solvent, for example, toluene, with oxalic acid in such a manner that at least one molecule oxalic acid is used per molecule of dyestuff. In this way, esterification takes place, with formation of water. In order to prevent the water formed from stopping the reaction, care is taken that the water formed is removed continuously by partial distillation of the solvent.

The dyestuffs which serve as parent substances in the present process are thus obtained by allowing diazo compounds of amines of the general formula $NO_2$—R—$NH_2$, in which R stands for a benzene nucleus and in which the $NO_2$ and $NH_2$ groups are in the para-position to one another, to act in known manner on amines which are free from sulfo and carboxyl groups and which are of the general formula

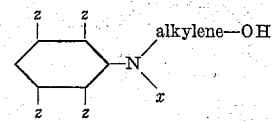

in which $x$ has the meaning already given and in which $z$ represents hydrogen or a substituent which does not oppose the coupling of the amine with diazo compounds in the para-position to the

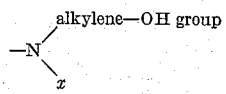 group

Some of the dyestuffs obtainable by the present process are, for example,

| | | Dyes acetate rayon— |
|---|---|---|
| 1 | 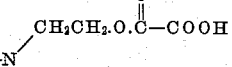 | Red orange. |
| 2 | 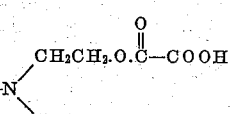 | Ruby red. |

| | | Dyes acetate rayon— |
|---|---|---|
| 3 | NO₂–⟨⟩(OCH₃)–N=N–⟨⟩–N(C₂H₅)(CH₂CH₂.O.CO–COOH) | Red. |
| 4 | NO₂–⟨⟩(SO₂CH₃)–N=N–⟨⟩–N(CH₂CH₂.O.CO–COOH)₂ | Violet. |
| 5 | NO₂–⟨⟩(SO₂CH₃)–N=N–⟨⟩–N(CH₃)(CH₂CH₂.O.CO–COOH) | Do. |
| 6 | NO₂–⟨⟩(SO₂CH₃)–N=N–⟨⟩–N(C₄H₉)(CH₂CH₂.O.CO–COOH) | Do. |
| 7 | NO₂–⟨⟩(CN)–N=N–⟨⟩–N(C₂H₅)(CH₂CH₂.O.CO–COOH) | Do. |
| 8 | NO₂–⟨⟩(Cl,Cl)–N=N–⟨⟩–N(C₂H₅)(CH₂CH₂.O.CO–COOH) | Brown-red. |
| 9 | NO₂–⟨⟩(Cl,Cl)–N=N–⟨⟩(CH₃)–N(H)(CH₂CH₂.O.CO–COOH) | Do. |
| 10 | NO₂–⟨⟩(Cl,NO₂)–N=N–⟨⟩(CH₃)–N(C₂H₅)(CH₂CH₂.O.CO–COOH) | Blue violet. |
| 11 | NO₂–⟨⟩(Cl,CN)–N=N–⟨⟩(CH₃)–N(CH₂CH₂.O.CO–COOH)₂ | Do. |
| 12 | NO₂–⟨⟩(NO₂)–N=N–⟨⟩(CH₃)–N(CH₃)(CH₂CH₂.O.CO–COOH) | Red violet. |
| 13 | NO₂–⟨⟩(Cl,NO₂)–N=N–⟨⟩–N(CH₂CH₂.O.CO–COOH)₂ | Violet. |
| 14 | NO₂–⟨⟩–N=N–⟨⟩–N(CH₂.CH(CH₂-Cl).O–CO–COOH)₂ | Red violet. |

| | | | Dyes acetate rayon— |
|---|---|---|---|
| 15 | 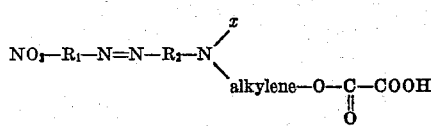 | | Blue. |
| 16 | 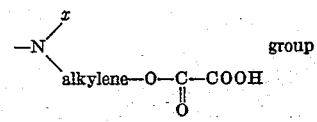 | | Brown. |

These dyestuffs, which, in the free state, correspond to the general formula $$NO_2-R_1-N=N-R_2-N\begin{matrix}x\\ \\alkylene-O-\underset{\underset{O}{\|}}{C}-COOH\end{matrix}$$

in which $R_1$ represents a nucleus of the benzene series in which the $NO_2$ and the —N=N— groups are in the para-position to one another, in which $R_2$ also represents a nucleus of the benzene series in which the —N=N—O groups and the $$-N\begin{matrix}x\\ \\alkylene-O-\underset{\underset{O}{\|}}{C}-COOH\end{matrix}\quad \text{group}$$

are in the para-position to one another, and in which $x$ stands for a member selected from the group consisting of hydrogen and an alkyl radical, alkyl including also substituted alkyl, are remarkable for their excellent dyeing properties. They form orange to red, violet-brown and blue dyestuffs, as the above table shows, which, in the form of their free acids and also in the form of their salts, dye particularly acetate rayon in the corresponding shades. On account of their ready solubility in water their use is especially simple.

Of particular value are those dyestuffs which contain the atomic grouping

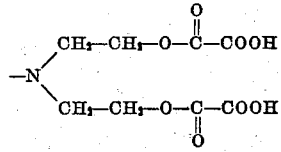

or those dyestuffs which consist of mixtures in which, in addition to dyestuffs with the above atomic grouping, are dyestuffs which possess the atomic grouping

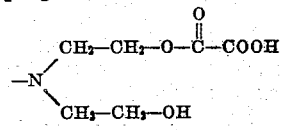

Another method of preparing these dyestuffs consists of treating with oxalic acid, in the presence of an organic solvent, amines of the general formula

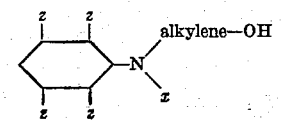

in which $z$ stands for hydrogen or a substituent which will not oppose the coupling with diazo compounds in the 4-position to the $$N\begin{matrix}alkylene-OH\\ \\x\end{matrix}\quad \text{group}$$

and $x$ represents a hydrogen atom or an alkyl group (this term includes also substituted alkyls such as a —$CH_2$—$CH_2$—OH—group).

As described in the case explained previously, an oxalic acid ester is obtained here, care being taken that the water liberated be removed from the reaction medium at the moment of its formation by partial distillation of the solvent. In this manner, bases of the general formula

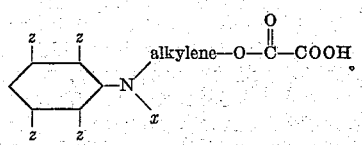

are obtained, in which $x$ and $z$ have the meanings already given, which possess the surprising property of being stable to water. It is actually known that the acid alkyl esters of oxalic acid are immediately saponified by water (cf. Berichte der deutschen Chemischen Gesellschaft, vol. 16, page 2413).

Thanks to their surprising stability, these intermediate products, by combination with diazo compounds of the benzene series, preferably those which are free from $SO_3H$ and COOH groups and which contain an $NO_2$ group in the para-position to the diazo group, may be built up into the same dyestuffs which, as already described, may be obtained by esterification of the finished dyestuff.

The following examples describe the present invention without in any way restricting it, the parts being by weight:

*Example 1*

10 parts of the dyestuff obtained by diazotization of 1-amino-4-nitrobenzene and coupling with 1 molecule of N-(ethyl-β-hydroxyethyl)-aminobenzene are mixed with 3–10 parts of anhydrous oxalic acid, and 300 parts of toluene are added to the mixture, which is then heated to the boiling point for 3 hours, the water formed by the esterification being collected by a suitable apparatus whilst the toluene which also distils is condensed and returned to the reaction vessel. When the reaction is completed, the toluene is removed by distillation, the solid residue is broken up, the excess of oxalic acid which may be present is extracted with water and the reaction product is then neutralized with ammonia in the presence of water. The aqueous solution or suspension of the dyestuff thus obtained is either distilled in vacuo or the dyestuff is precipitated by means of sodium chloride, filtered at the pump and dried in vacuo. The dyestuff formed is a dark powder which is readily soluble in water and which dyes acetate rayon in red-orange shades.

*Example 2*

A solution of 165 parts of N-(ethyl-β-hydroxyethyl)-aminobenzene and 135–180 parts of anhydrous oxalic acid in 1500 parts by volume of toluene is heated for 3 hours to the boiling point, the water formed during the esterification being trapped and removed from the reaction mixture. When the reaction is complete the toluene is removed by distillation and the remaining transparent residue which is viscous when warm but solid when cold, is dissolved in five to ten times its quantity of warm water. The clear solution reacts acid and may be used in this form for the manufacture of the dyestuff.

*Example 3*

The aqueous solution of the acid oxalic ester of Example 2 is added to the ice-cold diazo solution prepared by diazotizing 138 parts of 1-amino-4-nitrobenzene with 69 parts of sodium nitrite in hydrochloric acid solution by known methods. The coupling is brought to a conclusion by addition of sodium acetate solution, the dyestuff being thus precipitated to a great extent. The dyestuff suspension is then neutralized with ammonia and the dyestuff itself is completely precipitated by addition of sodium chloride, after which it is filtered at the pump, washed with cold water and dried in vacuo. The dyestuff is readily soluble in hot water and dyes acetate rayon like the dyestuff described in Example 1.

If 1-amino-4-nitrobenzene be replaced by 1-amino-2-chloro-4-nitrobenzene, a similar, water-soluble dyestuff is obtained which dyes acetate rayon in ruby red shades. With 1-amino-2-methoxy-4-nitrobenzene a product is obtained which dyes acetate rayon in red shades from its aqueous solution.

*Example 4*

A solution of 195 parts of N-β-dihydroxydiethyl-3-methyl-aminobenzene and 270 parts of anhydrous oxalic acid in 2800 parts by volume of toluene is heated to the boiling point for 2 hours, the water formed during the esterification being trapped and removed from the reaction mixture. When the toluene has been distilled away, a transparent, viscous mass remains, which forms a clear solution after neutralization of the aqueous mixture with ammonia. The solution thus obtained may be used directly to couple with suitable diazo components.

*Example 5*

If, to the solution of the acid oxalic acid ester of N-β-dihydroxydiethyl-3-methylaminobenzene obtained in Example 4, the diazo solution, obtained by diazotization of 138 parts of 1-amino-4-nitrobenzene by known methods, be added, and the coupling be brought to a conclusion by addition of sodium acetate until the mineral acid reaction disappears, a dyestuff is obtained by working up the resulting product in the manner described in Example 3 which is directly soluble in cold water and which dyes acetate rayon fast red shades.

*Example 6*

0.5 part of the dyestuff obtained in Example 1 is dissolved in 3000 parts of water. 40 parts of sodium sulfate crystals are added to this dyebath and 100 parts of acetate rayon yarn are worked in the bath for 1 hour at 80° C. After rinsing and drying, the acetate rayon is found to be dyed in a pure red-orange shade.

What we claim is:

1. The unsulfonated azo-dyestuffs which, in the free state, correspond to the general formula

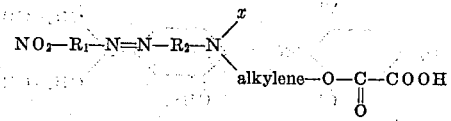

in which $R_1$ represents a nucleus of the benzene series in which the $NO_2$ and the —N=N— groups are in the para-position to one another in which $R_2$ also represents a nucleus of the benzene series in which the —N=N— group and the

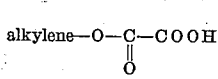 group are in the para-position to one another, and in which $x$ stands for a member selected from the group consisting of hydrogen, an alkyl radical, and an alkylene—O—C—COOH
            ||
            O radical, which products, in the form of their alkali salts, form water-soluble powders which dissolve in water to solutions which are orange to red, brown, violet or blue in color.

2. The unsulfonated azo-dyestuffs which, in the free state, correspond to the general formula

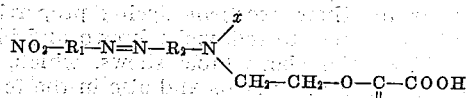

in which $R_1$ represents a nucleus of the benzene series in which the $NO_2$ and the —N=N— groups are in the para-position to one another, in which $R_2$ also represents a nucleus of the benzene series in which the —N=N— group and the

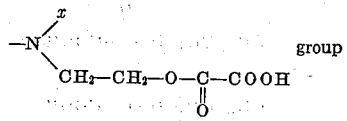 group are in the para-position to one another, and in which $x$ stands for a member selected from the group consisting of hydrogen, an alkyl radical, and an

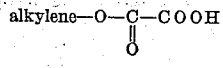

radical, which products, in the form of their alkali salts, form water-soluble powders which dissolve in water to solutions which are orange to red, brown, violet or blue in color.

3. The unsulfonated dyestuffs which correspond in the free state to the general formula

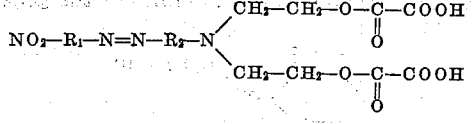

in which $R_1$ represents a nucleus of the benzene series in which the $NO_2$ and the —N=N— groups stand in the para-position to one another, in which $R_2$ also represents a nucleus of the benzene series in which the —N=N— group and the

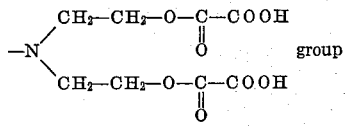 group stand in the para-position to one another, which products in the form of their alkali salts form water-soluble products which dissolve in water to form solutions which are orange to red, brown, violet or blue in color.

4. The dyestuff which corresponds in the free state to the formula

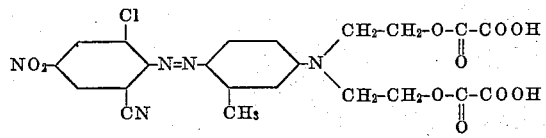

5. The dyestuff which corresponds in the free state to the formula

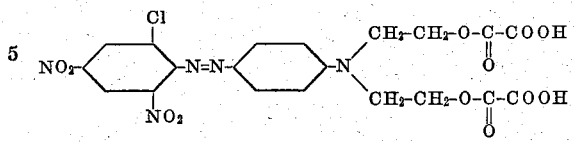

6. The dyestuff which corresponds in the free state to the formula

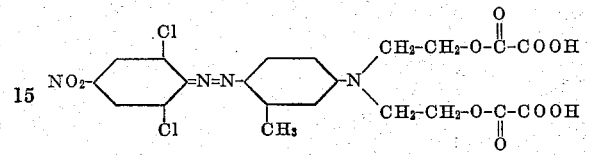

FRIEDRICH FELIX.
RUDOLF von CAPELLER.